(12) United States Patent
Davis

(10) Patent No.: US 8,191,574 B1
(45) Date of Patent: Jun. 5, 2012

(54) VISUAL INDICATOR FOR AIR TANK VALVE HANDLE

(76) Inventor: Edward H. Davis, Melrose, WI (US)

( * ) Notice: Subject to any disclaimer, the term of this patent is extended or adjusted under 35 U.S.C. 154(b) by 738 days.

(21) Appl. No.: 12/378,317

(22) Filed: Feb. 17, 2009

Related U.S. Application Data

(60) Provisional application No. 61/128,631, filed on May 27, 2008.

(51) Int. Cl.
*F15B 1/00* (2006.01)
*F16K 21/00* (2006.01)
*F16K 35/00* (2006.01)
*F17C 7/00* (2006.01)

(52) U.S. Cl. .................. 137/556; 116/227; 137/553

(58) Field of Classification Search .................. 137/556, 137/556.3, 556.6; 116/264, 266, 271, 273, 116/274, 277, 284
See application file for complete search history.

(56) References Cited

U.S. PATENT DOCUMENTS

| | | | | |
|---|---|---|---|---|
| 413,714 | A * | 10/1889 | Freeman | 137/553 |
| 473,488 | A * | 4/1892 | Wood | 116/277 |
| 1,338,263 | A * | 4/1920 | Thorne et al. | 116/277 |
| 2,247,090 | A * | 6/1939 | Jones et al. | 137/556.6 |
| 2,515,837 | A * | 6/1950 | Quinn | 137/556 |
| 2,709,566 | A * | 5/1955 | Davis | 251/148 |
| 2,829,538 | A * | 4/1958 | Mueller | 74/548 |
| RE26,838 | E * | 3/1970 | Pecis | 137/556 |
| 3,804,056 | A * | 4/1974 | Lee et al. | 116/277 |
| 3,994,255 | A | 11/1976 | Thompson | |
| 4,213,480 | A * | 7/1980 | Orum et al. | 137/556 |
| 4,316,482 | A * | 2/1982 | Pearce et al. | 137/315.07 |
| 4,432,385 | A * | 2/1984 | Legris | 137/271 |
| 4,442,860 | A * | 4/1984 | Taylor | 137/557 |
| 4,559,970 | A | 12/1985 | Taylor et al. | |
| 4,854,061 | A * | 8/1989 | Khoshkish | 40/495 |
| 5,004,011 | A | 4/1991 | Linder et al. | |
| 5,156,186 | A * | 10/1992 | Manska | 137/556 |
| 5,178,187 | A * | 1/1993 | Raymond et al. | 137/556 |
| 5,223,822 | A * | 6/1993 | Stommes et al. | 137/551 |
| 5,435,337 | A | 7/1995 | Kemp | |
| 5,609,185 | A * | 3/1997 | Booth et al. | 137/556 |
| 5,623,963 | A | 4/1997 | Stommes et al. | |
| 5,647,397 | A | 7/1997 | Heiniger et al. | |
| 5,823,509 | A * | 10/1998 | Daniels | 251/335.2 |
| 6,655,316 | B2 | 12/2003 | Kerger et al. | |
| 6,691,737 | B2 * | 2/2004 | Muller et al. | 137/556 |
| 6,742,541 | B2 | 6/2004 | Pimouguet | |

(Continued)

FOREIGN PATENT DOCUMENTS

EP 584975 A1 * 3/1994

*Primary Examiner* — Dana Ross
*Assistant Examiner* — Frederick D Soski
(74) *Attorney, Agent, or Firm* — Tipton L. Randall

(57) ABSTRACT

A visual indicator assembly displays the state of an isolated stem control valve contained in a housing of an air tank. The visual indicator assembly comprises a rotatable handle member adapted for operative connection to the isolated stem control valve contained in the housing of the air tank. The rotatable handle member opens and closes the control valve without axial movement of the rotatable handle member. An "OFF" indicator is visible with the control valve in a closed condition, and an "ON" indicator is non-visible with the control valve in a closed condition. The "ON" indicator is movable to become visible and obscure the "OFF" indicator upon rotation of the handle member to adjust the control valve to an open condition.

17 Claims, 16 Drawing Sheets

U.S. PATENT DOCUMENTS

| | | | |
|---|---|---|---|
| 6,871,665 B2 * | 3/2005 | Hannah et al. | 137/553 |
| 6,920,896 B2 * | 7/2005 | Kerger et al. | 137/553 |
| 7,028,927 B2 * | 4/2006 | Mermet | 239/569 |
| 7,114,520 B2 * | 10/2006 | Massengale et al. | 137/553 |
| 7,624,749 B2 * | 12/2009 | Guala | 137/15.18 |
| 8,033,293 B2 * | 10/2011 | Checiches et al. | 137/556 |
| 2005/0139268 A1 * | 6/2005 | Kremer et al. | 137/553 |
| 2009/0071554 A1 * | 3/2009 | Beckman et al. | 137/554 |

* cited by examiner

VISUAL INDICATOR FOR AIR TANK VALVE HANDLE

CROSS-REFERENCE TO RELATED APPLICATIONS, IF ANY

This application claims the benefit under 35 U.S.C. §119 (e) of provisional application Ser. No. 61/128,631, filed 27 May, 2008. Application Ser. No. 61/128,631 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to a visual indicator for a valve and, more particularly, to a visual indicator for a valve with a rotary handle and, most particularly, to a visual indicator for an air tank valve with a rotary handle that does not move axially when rotated.

2. Background Information

Scuba tank valve handles currently on the market offer no easy way to visually determine whether the scuba tank air valve is in the "on" or "off" position. When trained for dive certifications, new divers are taught to release the air from the tank to their scuba first and second stage regulators by fully opening the tank valve. Normally, the procedure is three full turns on the handle, then rotating the valve handle one-quarter turn closed. The intention behind this procedure is so that a dive master, or a dive buddy, can determine the state of the valve by rotating the tank handle, to determine whether the tank valve is full, less a quarter turn, or full off, less no turn. With the many configurations in dive tank valves, such as stand alone, H-Valves, manifold with isolator valves, left-handed valves, right-handed valves, etc., it becomes very confusing for the diver and his buddy to determine whether the valve is turned on or off. It is a dive industry standard to have all tank valves open and close using the "righty, tighty, lefty, loosey rule," regardless of tank handle and valve position or configuration. Unfortunately, because of the various configurations and unfamiliarity with valves mounted on the right or left side of a tank, once opened, other well meaning individuals may inadvertently close a valve and proceed to open the valve by only one-quarter turn.

One situation that can result due to this practice is that with his/her valve open one-quarter of a turn, the diver may receive enough air to start his dive with an ample air supply. This is possible because the tank pressure is great enough to allow pressurized air to pass through the valve seat at one-quarter turn. As the dive proceeds, air pressure drops due to reduced air pressure in the tank as air is consumed and/or the greater volume of air and air pressure required at greater depths. In either case, the valve may inadvertently seal shut, resulting in the catastrophic loss of air supply.

Another situation that is encountered when the tank valve is inadvertently turned to the closed position and then opened one-quarter turn is that enough air remains in the charged system for two full breaths before the air is depleted. Upon entering the water, a diver may release the air from his/her buoyancy compensating device. Without air to breathe or to compensate for their negative buoyancy, the diver falls into an uncontrolled decent.

There have been many documented cases of both of these scenarios throughout the dive community, in which many resulted in a fatality or serious injury due to decompression sickness.

There are many devices that have been installed on valves to indicate whether the valve is open or closed. Several of these devices have received a patent, including the following: U.S. Pat. No. 3,804,056 by Lee et al.; U.S. Pat. No. 3,994,255 by Thompson; U.S. Pat. No. 4,213,480 by Orum et al.; U.S. Pat. No. 4,432,385 by Legris; U.S. Pat. No. 4,442,860 by Taylor; U.S. Pat. No. 4,559,970 by Taylor; U.S. Pat. No. 5,187,064 by Linder et al.; U.S. Pat. No. 5,223,822 by Stommes et al.; U.S. Pat. No. 5,435,337 by Kemp; U.S. Pat. No. 5,609,185 by Booth et al.; U.S. Pat. No. 5,623,963 by Stommes et al.; U.S. Pat. No. 5,647,397 by Heiniger et al.; U.S. Pat. No. 5,823,509 by Daniels; U.S. Pat. No. 6,655,316 by Kerger et al.; U.S. Pat. No. 6,691,737 by Muller et al.; U.S. Pat. No. 6,742,541 by Pimouguet; U.S. Pat. No. 6,871,665 by Hannah et al., and U.S. Pat. No. 7,114,520 by Massengale et al.

A simple solution is to install an easy to read, color coded, visual tank valve handle indicator, which indicates whether the tank valve has been turned full on or full off at a glance. This ensures that standard training procedures and practices are adhered to, thus verifying that the tank handle indicator is functioning properly and breathing air has been turned on. Applicant has invented such a visual indicator system for the tank valve and attached handle of a scuba air tank.

SUMMARY OF THE INVENTION

The invention is directed to a visual indicator assembly for an isolated stem control valve contained in a housing of an air tank. The visual indicator assembly comprises a rotatable handle member adapted for operative connection to the isolated stem control valve contained in the housing of the air tank. The rotatable handle member opens and closes the control valve without axial movement of the rotatable handle member. An "OFF" indicator is visible with the control valve in a closed condition, and an "ON" indicator is non-visible with the control valve in a closed condition. The "ON" indicator is movable to become visible and obscure the "OFF" indicator upon rotation of the handle member to adjust the control valve to an open condition.

In one embodiment, the "OFF" indicator is contained on a cylindrical sleeve member extending axially from the rotatable handle member, and the "ON" indicator is contained on a cylindrical sleeve member selectively movable into and out of the rotatable handle member.

In another embodiment, the "OFF" indicator is contained on the housing of the control valve adjacent the rotatable handle member operatively connected to the control valve therein, and the "ON" indicator is contained on a cylindrical sleeve member selectively movable into and out of the rotatable handle member.

DESCRIPTION OF THE EMBODIMENTS

Nomenclature

Figure 1:
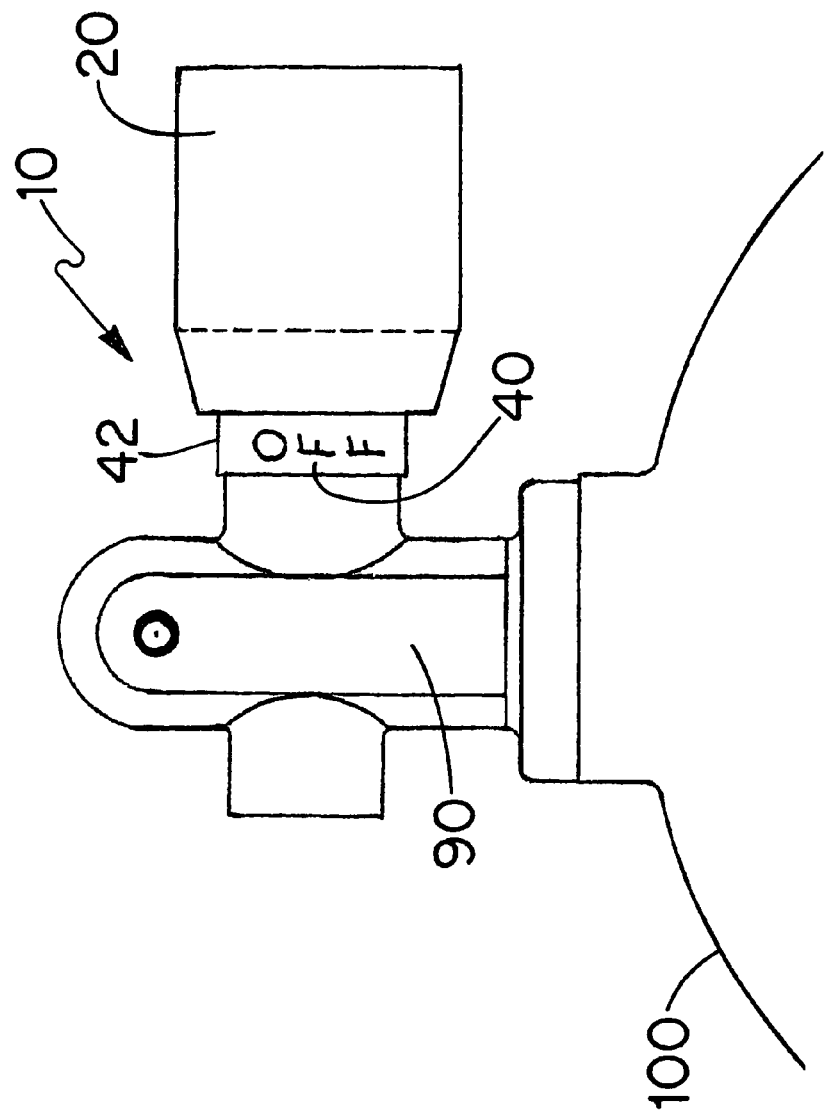
FIG. 1 is a perspective view of an air tank with the visual indicator assembly of the present invention showing the "OFF" condition for the control valve.

| | |
|---|---|
| 10 | Visual Indicator Assembly |
| 20 | Rotatable Handle Member |
| 22 | Biasing Spring |
| 24 | Threaded Cap |
| 30 | Threaded Cup Member |
| 32 | Internal Threads of Cup Member |
| 34 | Square Aperture of Cup Member |
| 36 | Internal Lands of Cup Member |
| 40 | "OFF" Indicator |
| 42 | Cylindrical Sleeve Member |
| 44 | External Grooves of Sleeve Member |
| 46 | External Threads of Sleeve Member |
| 48 | Hex Nut Cavity of Sleeve Member |
| 50 | "ON" Indicator |
| 52 | Cylindrical Sleeve Member |
| 54 | External Threads of Sleeve Member |
| 56 | Internal Lands of Sleeve Member |
| 58 | External Groove of Sleeve Member |
| 60 | Internal Threads of Sleeve Member |
| 65 | Isolated Stem Control Valve |
| 70 | Isolated Stem of Control Valve |
| 72 | Packing Nut of Control Valve |
| 74 | External Threads of Packing Nut |
| 75 | Slot of Isolated Stem |
| 76 | External Grooves of Packing Nut |
| 80 | Body Portion of Control Valve |
| 85 | Lip of Body Portion of Control Valve |
| 90 | Housing of Tank Control Valve |
| 92 | External Threads of Housing |
| 94 | External Grooves of Housing |
| 95 | Passage Way of Housing |
| 100 | Air Tank |

Construction

The invention is a visual indicator assembly for an isolated stem control valve contained in a housing of an air tank. The visual indicator assembly comprises a rotatable handle member adapted for operative connection to the isolated stem control valve contained in the housing of the air tank. The rotatable handle member opens and closes the control valve without axial movement of the rotatable handle member. An "OFF" indicator is visible with the control valve in a closed condition, and an "ON" indicator is non-visible with the control valve in a closed condition. The "ON" indicator is movable to become visible and the movement of the "ON" indicator obscures the "OFF" indicator upon rotation of the handle member to adjust the control valve to an open condition.

In one embodiment, the "OFF" indicator is contained on a cylindrical sleeve member extending axially from the rotatable handle member, and the "ON" indicator is contained on a cylindrical sleeve member selectively movable into and out of the rotatable handle member.

In another embodiment, the "OFF" indicator is contained on the housing of the control valve adjacent the rotatable handle member operatively connected to the control valve therein, and the "ON" indicator is contained on a cylindrical sleeve member selectively movable into and out of the rotatable handle member.

In the description of the present invention, the term "land" is defined as "that part of a grooved surface which is not indented, as any of the ridges between the grooves in the bore of a rifle." The term "groove" is defined as "a linear, narrow furrow or hollow cut in a surface."

The visual indicator assembly 10 of the present invention is employed with a control valve for an air tank commonly used for scuba equipment. Scuba air tanks are fitted with an isolated stem control valve operated by a rotatable handle member 20 that does not move axially when rotated. Should the handle member 20 be damaged or broken during handling of the tank, only the isolated stem is affected. The sealing portion of the control valve remains in tact, containing the contents of the air tank.

Figure 2:
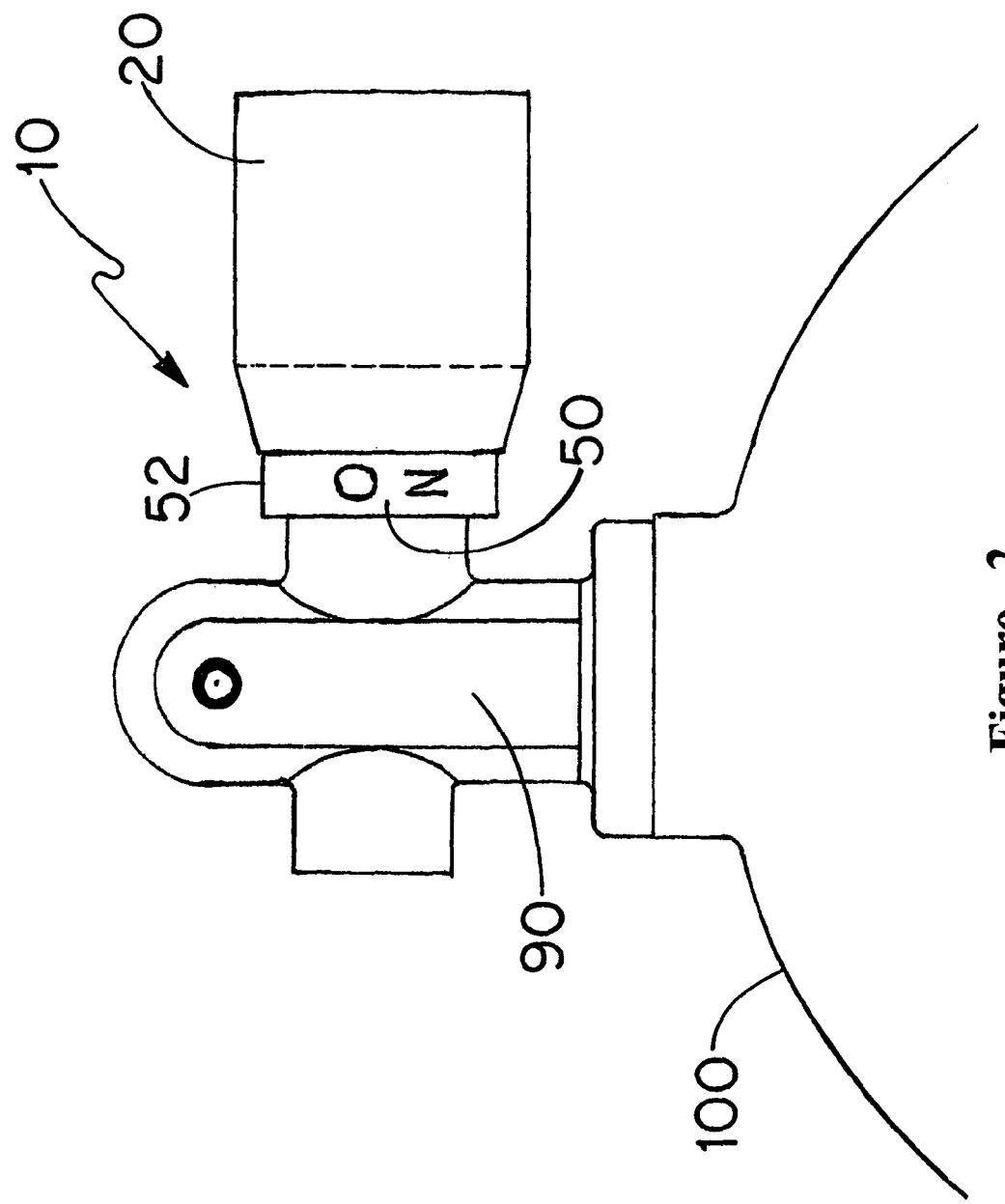
FIG. 2 is a perspective view of an air tank with the visual indicator assembly of the present invention showing the "ON" condition for the control valve.

Referring now to FIGS. 1 and 2, an installed, visual indicator assembly 10 is illustrated. In FIG. 1, the indicator assembly 10 clearly shows the isolated stem control valve 65 is "OFF" or closed, while in FIG. 2, the indicator assembly 10 clearly shows the isolated stem control valve 65 is "ON" or open. There is no question as to the state of the control valve 80 in either illustration. This embodiment of the indicator assembly 10 includes an "OFF" indicator 40 contained on a cylindrical sleeve member 42 that extends from the rotatable handle member 20 and is mounted to the housing 90 of the isolated stem control valve 65, adjacent to the rotatable handle member 20. The "ON" indicator 50 is mounted on a second cylindrical sleeve member 52 that is positioned within the rotatable handle member 20, with the control valve 65 in a closed condition, as illustrated in FIG. 1. The sleeve member 52 is sufficiently large that it can enclose the sleeve member 42. Rotation of the handle member 20 causes the second cylindrical sleeve member 52 to extend from the handle member 20, such that the "ON" indicator 50 becomes visible and obscures the "OFF" indicator 40 contained on the cylindrical sleeve member 42. Preferably, a plurality of both the "ON" indicator 50 and the "OFF" indicator 40 are positioned around the outer circumference of the respective cylindrical sleeve members 42, 52, so that the indicators 42, 52 are visible from any location. Additionally, the cylindrical sleeve members 42, 52 are color coded with the "OFF" sleeve member 42 colored red and the "ON" sleeve member 52 colored green for added clarity.

Figure 3:
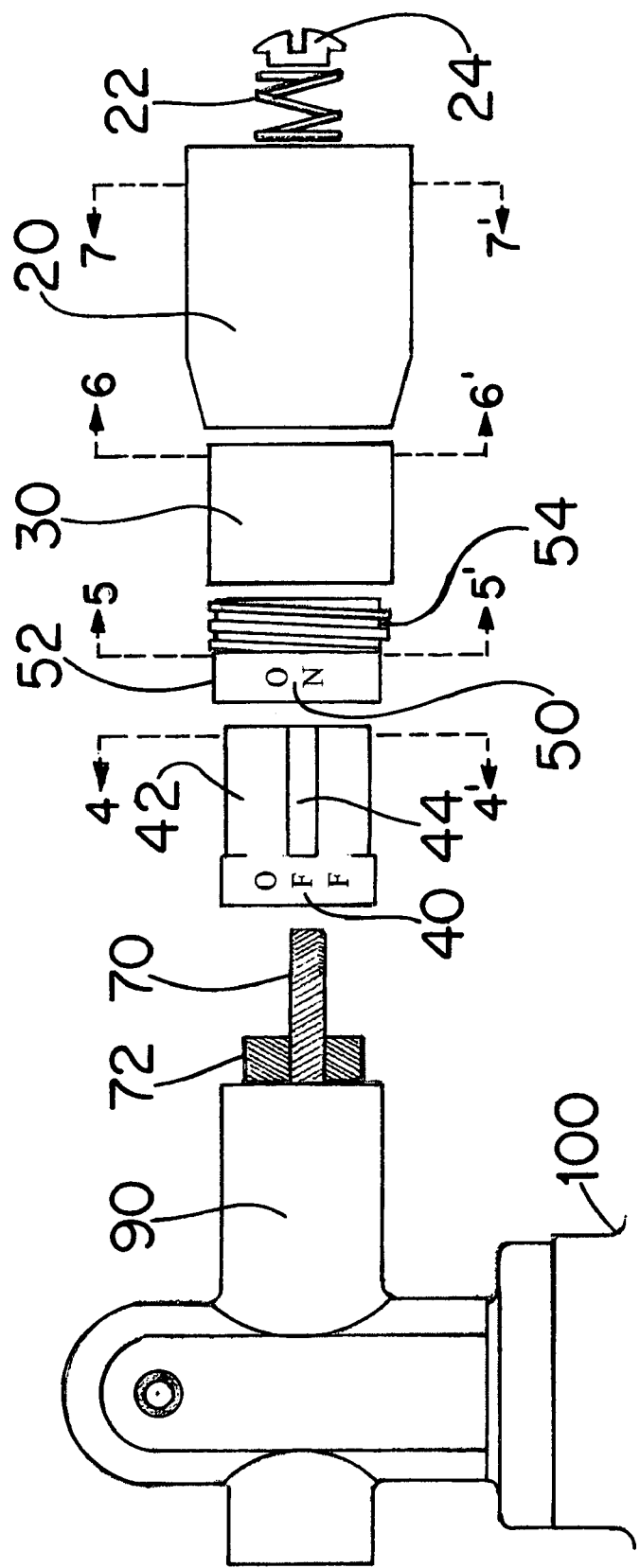
FIG. 3 is an exploded view of a first embodiment of the visual indicator assembly of the present invention aligned with the control valve of an air tank.
Figure 7:
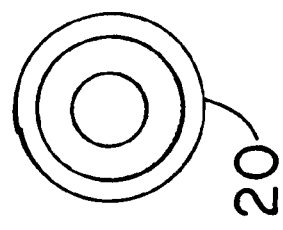
FIG. 7 is a cross sectional view along line 7-7' of one of the elements of the first embodiment of the visual indicator assembly of FIG. 3 of the present invention.
Figure 6:
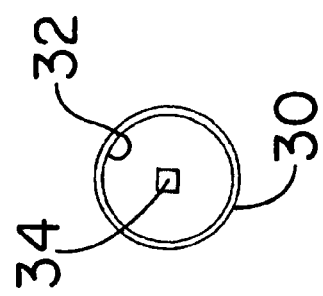
FIG. 6 is a cross sectional view along line 6-6' of one of the elements of the first embodiment of the visual indicator assembly of FIG. 3 of the present invention.
Figure 5:
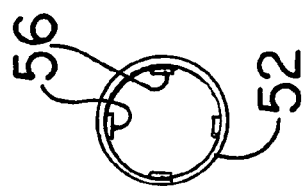
FIG. 5 is a cross sectional view along line 5-5' of one of the elements of the first embodiment of the visual indicator assembly of FIG. 3 of the present invention.
Figure 4:
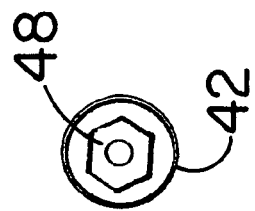
FIG. 4 is a cross sectional view along line 4-4' of one of the elements of the first embodiment of the visual indicator assembly of FIG. 3 of the present invention.
Figure 8:
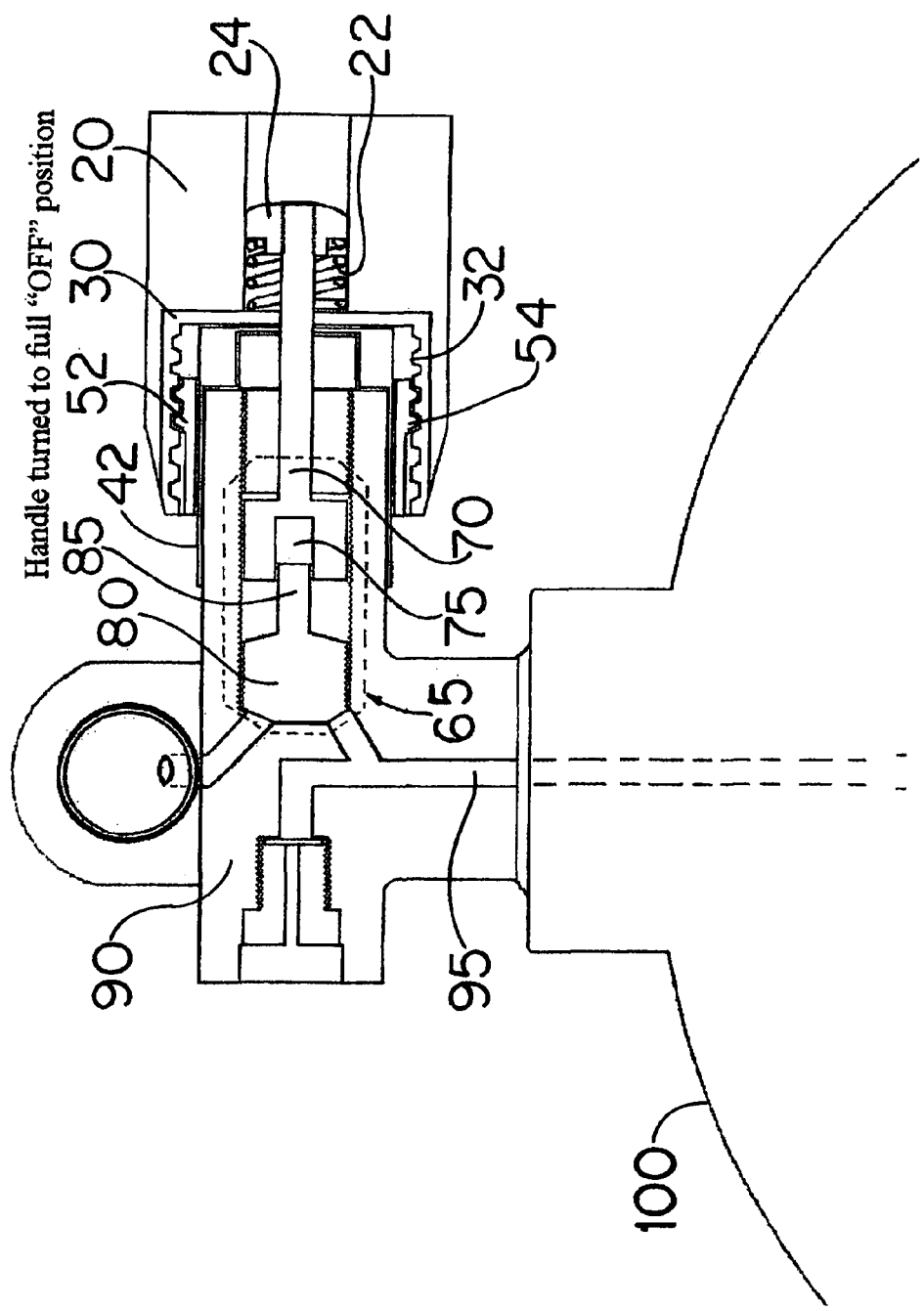
FIG. 8 is a cross sectional view of an air tank fitted with the first embodiment of the visual indicator assembly of the present invention showing the "OFF" condition for the control valve.
Figure 9:
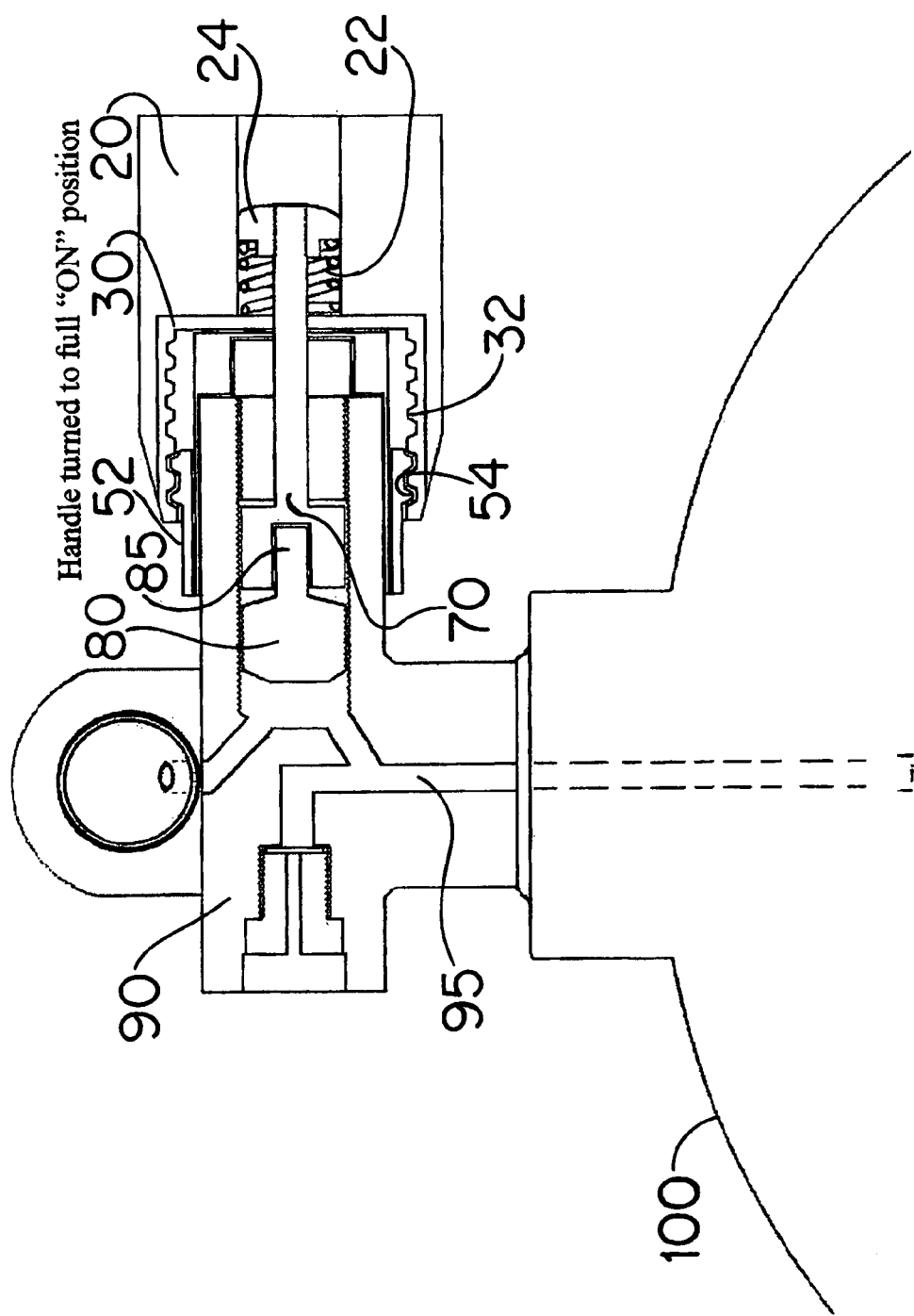
FIG. 9 is a cross sectional view of an air tank fitted with the visual indicator assembly of the present invention showing the "ON" condition for the control valve.

Referring now to FIG. 3, an exploded view of a first embodiment of the visual indicator assembly 10 is shown. The first embodiment of the visual indicator assembly 10 includes the hollow, rotatable handle member 20, with an internally threaded cup member 30 attached within the handle member 20. The handle member 20 and internal cup member 30 extend over a portion of the control valve housing 90, with the handle member 20 attached to the isolated valve stem 70 by the threaded cap 24. The cup member 30 includes internal threads 32, best seen in FIGS. 8 and 9. A cylindrical sleeve member 42, with a hex nut cavity 48 and an "OFF" indicator 40 there upon, is mounted to the housing 90 of the isolated stem control valve 65 adjacent to the rotatable handle member 20. The hex nut cavity 48, shown in FIG. 4, of the cylindrical sleeve member 42 engages the packing nut 72 that secures the isolated stem control valve 65 within the housing 90. This arrangement prevents the cylindrical sleeve member 42 from rotating when the handle member 20 rotates. The cylindrical sleeve member 40 includes external grooves 44 for engaging the cylindrical sleeve member 52 containing the "ON" indicator 50, as indicated below. The cylindrical sleeve member 42 extends beyond the handle member 20 to display the "OFF" indicator 40, as illustrated in FIG. 1. The threaded sleeve member 52, with internal lands 56 and an "ON" indicator 50, is mounted over the cylindrical sleeve member 42, with the internal lands 56, shown in FIG. 5, engaging the external grooves 44 of the cylindrical sleeve member 42. The cylindrical sleeve member 52 includes exterior threads 54 and is positioned within the threaded cup member 30, with the exterior threads 54 engaging the internal threads 32 of the cup member 30, as illustrated in FIGS. 8 and 9. The "ON" indicator 50 is contained within the threaded cup member 30, with the control valve 65 in the closed condition. Rotation of the handle member 20 to open the control valve 65 of the air tank 100 imparts axial movement only to the threaded sleeve member 52, via the threaded cup member 30, which includes a square aperture 34 that engages the control valve stem 70. Such rotation extends the sleeve member 52 exterior to the handle member 20 and internal cup member 30, thereby covering the "OFF" indicator 40 of the cylindrical sleeve member 42 and exposing the "ON" indicator 50 of the threaded sleeve member 52. In this state, the passage way 95 within the housing 90 is open (FIG. 9). Conversely, rotation of the handle member 20 to close the control valve 65 of the air tank 100 also imparts axial movement only to the threaded sleeve member 52, via the internally threaded cup member 30. Such rotation retracts the sleeve member 52 within the handle member 20 and internal cup member 30, thereby exposing the "OFF" indicator 40 of the cylindrical sleeve member 42 and covering the "ON" indicator 50 of the threaded sleeve member 52. In this state, the passage way 95 within the housing 90 is closed (FIG. 8).

FIGS. 8 and 9 are cross sectional views of the installed, visual indicator assembly 10 of FIGS. 1 and 2, respectively. The housing 90 attached to the air tank 100 includes a passage way 95 that is controlled by the isolated stem control valve 65. The body portion 80 of the control valve 65 contains exterior threads that mate with threads within the housing 90. Rotation of the stem 70 of the control valve 65 moves the body portion 80 of the control valve 65 within the housing 90, with the linear movement depending upon the direction of rotation of the isolated stem 70 of the control valve 65.

With the body portion 80 of the control valve member 65 seated within the passageway 95 (FIG. 8), the contents of the air tank 100 are sealed off in the closed or "OFF" condition for the control valve 65. With the body portion 80 of the control valve member 65 moved out of the passageway 95 (FIG. 9), the contents of the air tank 100 are open to exit the air tank 100 in the open or "ON" condition for the control valve 65. Lateral movement of the body portion 80 of the control valve 65 is achieved by rotation of the handle member 20, which is attached to the isolated stem 70 of the control valve 65 by a biasing spring 22 and threaded cap 24. The isolated stem 70 includes a slot 75 that engages a lip 85 on the body portion 80 of the control valve 65. Thus, the isolated stem 70 rotates, but does not move axially, while the body portion 80 of the control valve 65 both rotates and moves axially to open and close the passageway 95. Thus, the body portion 80 of the control valve 65 is isolated from the stem 70 and attached handle member 20, for the reasons explained above.

Figure 10:
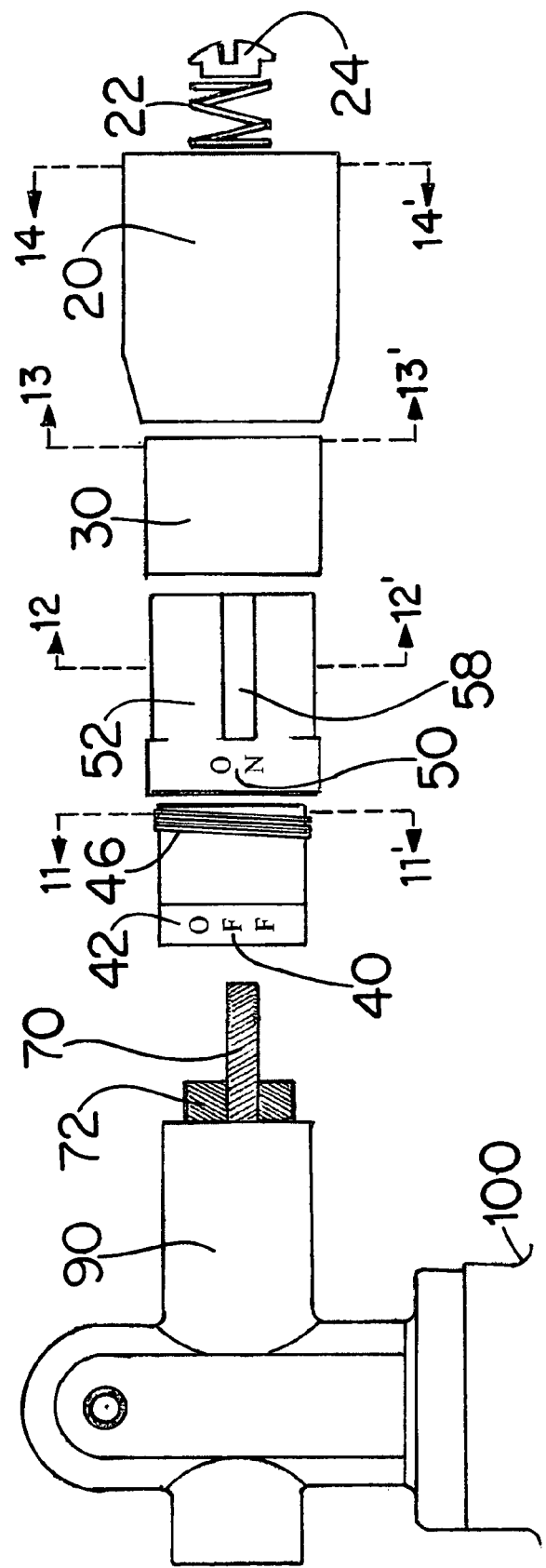
FIG. 10 is an exploded view of a second embodiment of the visual indicator assembly of the present invention aligned with the control valve of an air tank.
Figure 14:
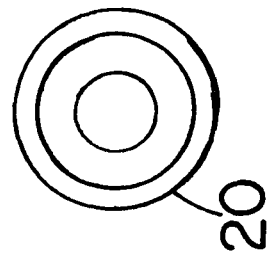
FIG. 14 is a cross sectional view along line 14-14' of one of the elements of the second embodiment of the visual indicator assembly of FIG. 10 of the present invention.
Figure 13:
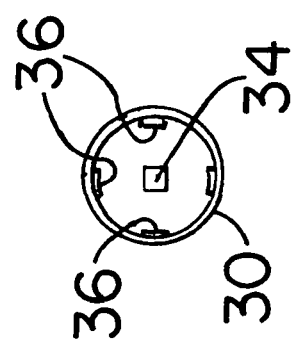
FIG. 13 is a cross sectional view along line 13-13' of one of the elements of the second embodiment of the visual indicator assembly of FIG. 10 of the present invention.
Figure 12:
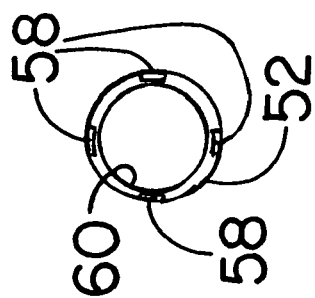
FIG. 12 is a cross sectional view along line 12-12' of one of the elements of the second embodiment of the visual indicator assembly of FIG. 10 of the present invention.
Figure 11:
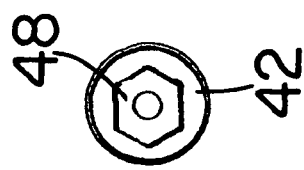
FIG. 11 is a cross sectional view along line 11-11' of one of the elements of the second embodiment of the visual indicator assembly of FIG. 10 of the present invention.

Referring now to FIG. 10, an exploded view of a second embodiment of the visual indicator assembly 10 is shown. The second embodiment of the visual indicator assembly 10 includes the hollow, rotatable handle member 20, with a cup member 30 with internal lands 36, which is attached within the handle member 20. The handle member 20 and internal cup member 30 extend over a portion of the control valve housing 90, with the handle member 20 attached to the isolated valve stem 70 by the threaded cap 24 and a biasing spring 22. A cylindrical sleeve member 42, with a hex nut cavity 48 and an "OFF" indicator 40 there upon, is mounted to the housing 90 of the isolated stem control valve 65 adjacent to the rotatable handle member 20. The hex nut cavity 48, shown in FIG. 11, of the cylindrical sleeve member 42 engages the packing nut 72 that secures the isolated stem control valve 65 within the housing 90. This arrangement prevents the cylindrical sleeve member 42 from rotating when the handle member 20 rotates. The cylindrical sleeve member 42 includes external threads 46 for engaging internal threads 60 of the cylindrical sleeve member 52 containing the "ON" indicator 50, as indicated below. The cylindrical sleeve member 42 extends beyond the handle member 20 to display the "OFF" indicator 40. The internally threaded sleeve member 52, with external grooves 58 and an "ON" indicator 50, is mounted over the cylindrical sleeve member 42, with the internal threads 60, shown in FIG. 12, engaging the external threads 46 of the cylindrical sleeve member 42. The cylindrical sleeve member 52 includes exterior grooves 58 and is positioned within the threaded cup member 30, with the exterior grooves 58 engaging the internal lands 36 of the cup member 30. The "ON" indicator 50 is contained within the threaded cup member 30, with the control valve 65 in the closed condition. Rotation of the handle member 20 to open the control valve 65 of the air tank 100 imparts both axial and rotational movement to the internally threaded sleeve member 52, via the cup member 30 with internal lands 36 and the externally threaded sleeve member 42. The cup member 30 also includes a square aperture 34 that engages the control valve stem 70. Such rotation extends the sleeve member 52 exterior to the handle member 20 and internal cup member 30, thereby covering the "OFF" indicator 40 of the cylindrical sleeve member 42 and exposing the "ON" indicator 50 of the internally threaded sleeve member 52. In this state, the passage way 95 within the housing 90 is open. Conversely, rotation of the handle member 20 to close the control valve 65 of the air tank 100 also imparts both axial and rotational movement to the internally threaded sleeve member 52, via the cup member 30 with internal lands 36. Such rotation retracts the sleeve member 52 within the handle member 20 and internal cup member 30, thereby exposing the "OFF" indicator 40 of the cylindrical sleeve member 42 and covering the "ON" indicator 50 of the internally threaded sleeve member 52. In this state, the passage way 95 within the housing 90 is closed.

Figure 15:
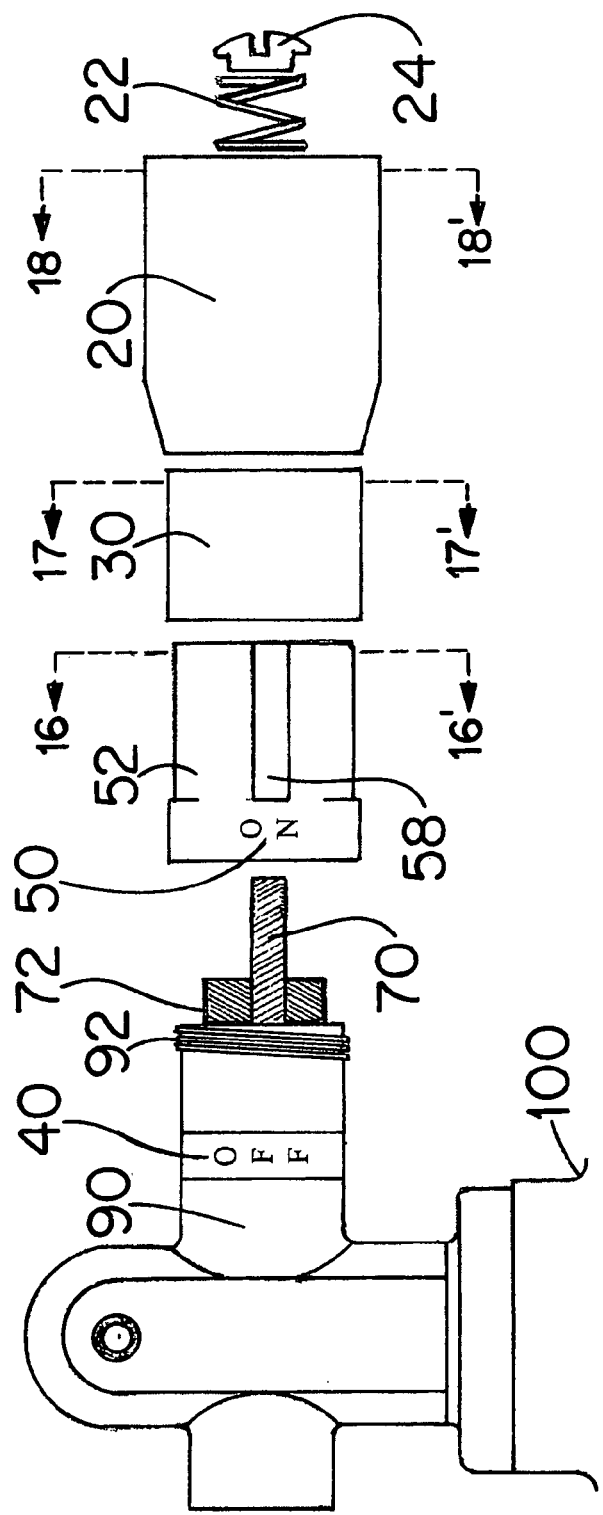
FIG. 15 is an exploded view of a third embodiment of the visual indicator assembly of the present invention aligned with the control valve of an air tank.
Figure 18:
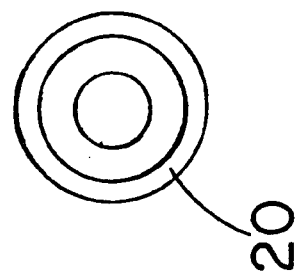
FIG. 18 is a cross sectional view along line 18-18' of one of the elements of the third embodiment of the visual indicator assembly of FIG. 10 of the present invention.
Figure 17:
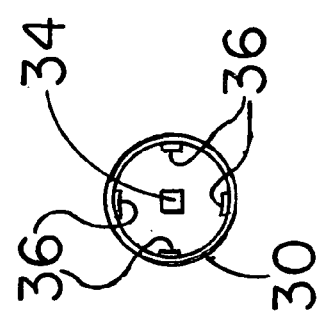
FIG. 17 is a cross sectional view along line 17-17' of one of the elements of the third embodiment of the visual indicator assembly of FIG. 15 of the present invention.
Figure 16:
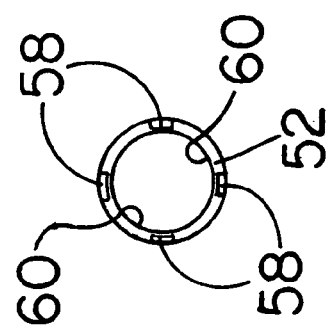
FIG. 16 is a cross sectional view along line 16-16' of one of the elements of the third embodiment of the visual indicator assembly of FIG. 15 of the present invention.

Referring now to FIG. 15, an exploded view of a third embodiment of the visual indicator assembly 10 is shown. The third embodiment of the visual indicator assembly 10 includes the hollow, rotatable handle member 20, with a cup member 30 with internal lands 36, which is attached within the handle member 20. The handle member 20 and internal cup member 30 extend over a portion of the control valve housing 90, with the handle member 20 attached to the isolated valve stem 70 by the threaded cap 24 and a biasing spring 22. In this embodiment, the "OFF" indicator 40 is positioned on the housing 90 containing the isolated stem control valve 65, adjacent to the rotatable handle member 20. The housing 90 includes external threads 92 for engaging internal threads 60 of the cylindrical sleeve member 52 containing the "ON" indicator 50, as indicated below. The internally threaded sleeve member 52, with external grooves 58 and an "ON" indicator 50, is mounted over the housing 90 containing external threads 92, with the internal threads 60, shown in FIG. 16, engaging the external threads 92 of the housing 90. The cylindrical sleeve member 52 includes exterior grooves 58 and is positioned within the threaded cup member 30, with the exterior grooves 58 engaging the internal lands 36 of the cup member 30. The "ON" indicator 50 is contained within the threaded cup member 30, with the control valve 65 in the closed condition. Rotation of the handle member 20 to open the control valve 65 of the air tank 100 imparts both axial and rotational movement to the internally threaded sleeve member 52, via the cup member 30 with internal lands 36 and the externally threaded housing 90. The cup member 30 also includes a square aperture 34 that engages the control valve stem 70. Such rotation extends the sleeve member 52 exterior to the handle member 20 and internal cup member 30, thereby covering the "OFF" indicator 40 of the housing 90 and exposing the "ON" indicator 50 of the internally threaded sleeve member 52. In this state, the passage way 95 within the housing 90 is open. Conversely, rotation of the handle member 20 to close the control valve 65 of the air tank 100 also imparts both axial and rotational movement to the internally threaded sleeve member 52, via the cup member 30 with internal lands 36. Such rotation retracts the sleeve member 52 within the handle member 20 and internal cup member 30, thereby exposing the "OFF" indicator 40 of the housing 90 and covering the "ON" indicator 50 of the internally threaded sleeve member 52. In this state, the passage way 95 within the housing 90 is closed.

Figure 19:
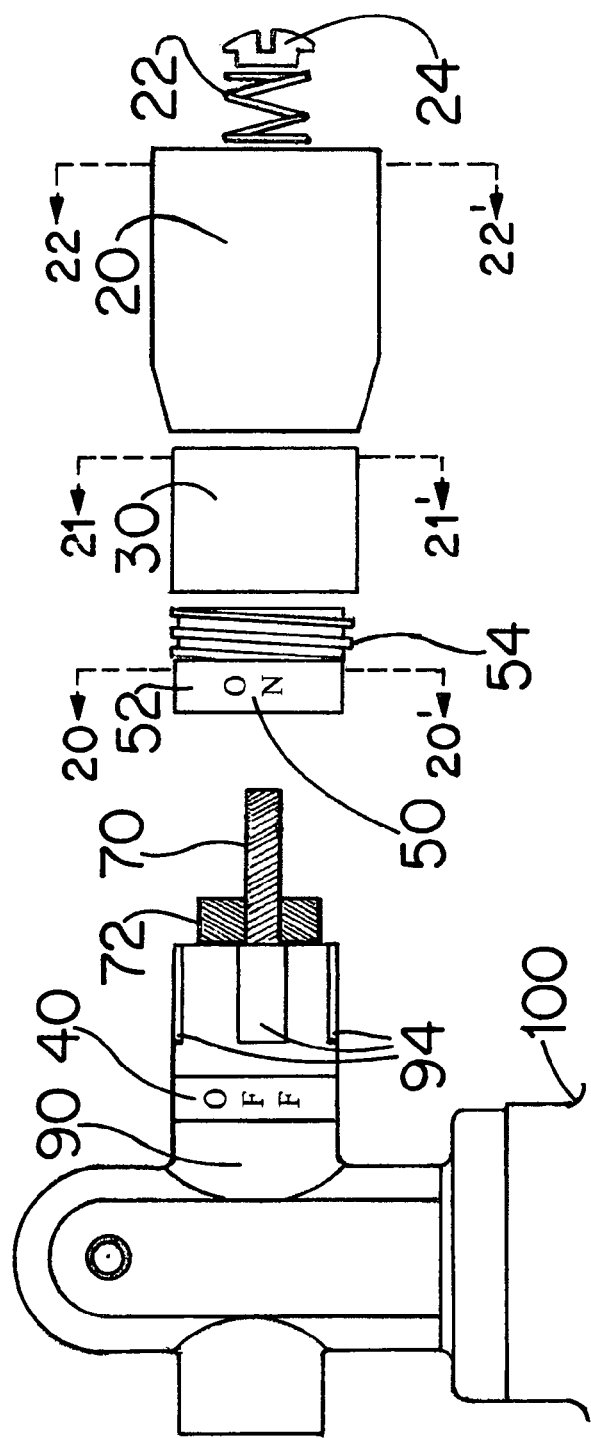
FIG. 19 is an exploded view of a fourth embodiment of the visual indicator assembly of the present invention aligned with the control valve of an air tank.
Figure 22:
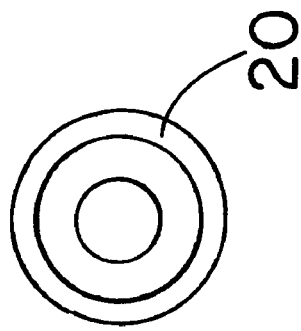
FIG. 22 is a cross sectional view along line 22-22' of one of the elements of the fourth embodiment of the visual indicator assembly of FIG. 19 of the present invention.
Figure 21:
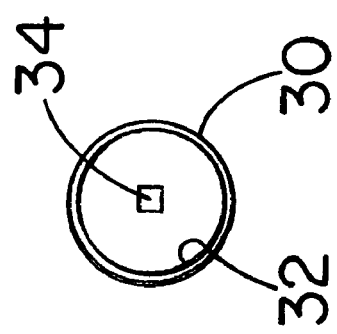
FIG. 21 is a cross sectional view along line 21-21' of one of the elements of the fourth embodiment of the visual indicator assembly of FIG. 19 of the present invention.
Figure 20:
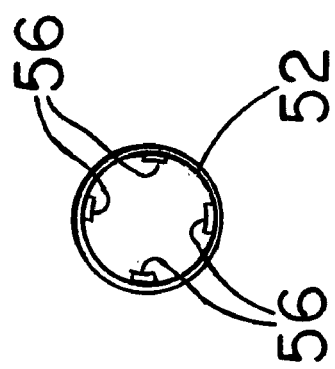
FIG. 20 is a cross sectional view along line 20-20' of one of the elements of the fourth embodiment of the visual indicator assembly of FIG. 19 of the present invention.

Referring now to FIG. 19, an exploded view of a fourth embodiment of the visual indicator assembly 10 is shown. The fourth embodiment of the visual indicator assembly 10 includes the hollow, rotatable handle member 20, with a cup member 30 with internal threads 32, which is attached within the handle member 20. The handle member 20 and internal cup member 30 extend over a portion of the control valve housing 90, with the handle member 20 attached to the isolated valve stem 70 by the threaded cap 24 and a biasing spring 22. In this embodiment, the "OFF" indicator 40 is positioned on the housing 90 containing the isolated stem control valve 65 adjacent to the rotatable handle member 20. The housing 90 includes external grooves 94 for engaging internal lands 56 of the cylindrical sleeve member 52 containing the "ON" indicator 50, as indicated below. The threaded sleeve member 52, with internal lands 56 and an "ON" indicator 50, is mounted over the housing 90, with the internal lands 56, shown in FIG. 20, engaging the external grooves 94 of the housing 90. The cylindrical sleeve member 52 includes exterior threads 54 and is positioned within the threaded cup member 30, with the exterior threads 54 engaging the internal threads 32 of the cup member 30. The "ON" indicator 50 is contained within the threaded cup member 30, with the control valve 65 in the closed condition. Rotation of the handle member 20 to open the control valve 65 of the air tank 100 imparts axial movement only to the threaded sleeve member 52, via the threaded cup member 30, which includes a square aperture 34 that engages the control valve stem 70. Such rotation extends the sleeve member 52 exterior to the handle member 20 and internal cup member 30, thereby covering the "OFF" indicator 40 of the housing 90 and exposing the "ON" indicator 50 of the threaded sleeve member 52. In this state, the passage way 95 within the housing 90 is open. Conversely, rotation of the handle member 20 to close the control valve 65 of the air tank 100 also imparts axial movement only to the threaded sleeve member 52, via the internally threaded cup member 30. Such rotation retracts the sleeve member 52 within the handle member 20 and internal cup member 30, thereby exposing the "OFF" indicator 40 of the housing 42 and covering the "ON" indicator 50 of the threaded sleeve member 52. In this state, the passage way 95 within the housing 90 is closed.

Figure 23:
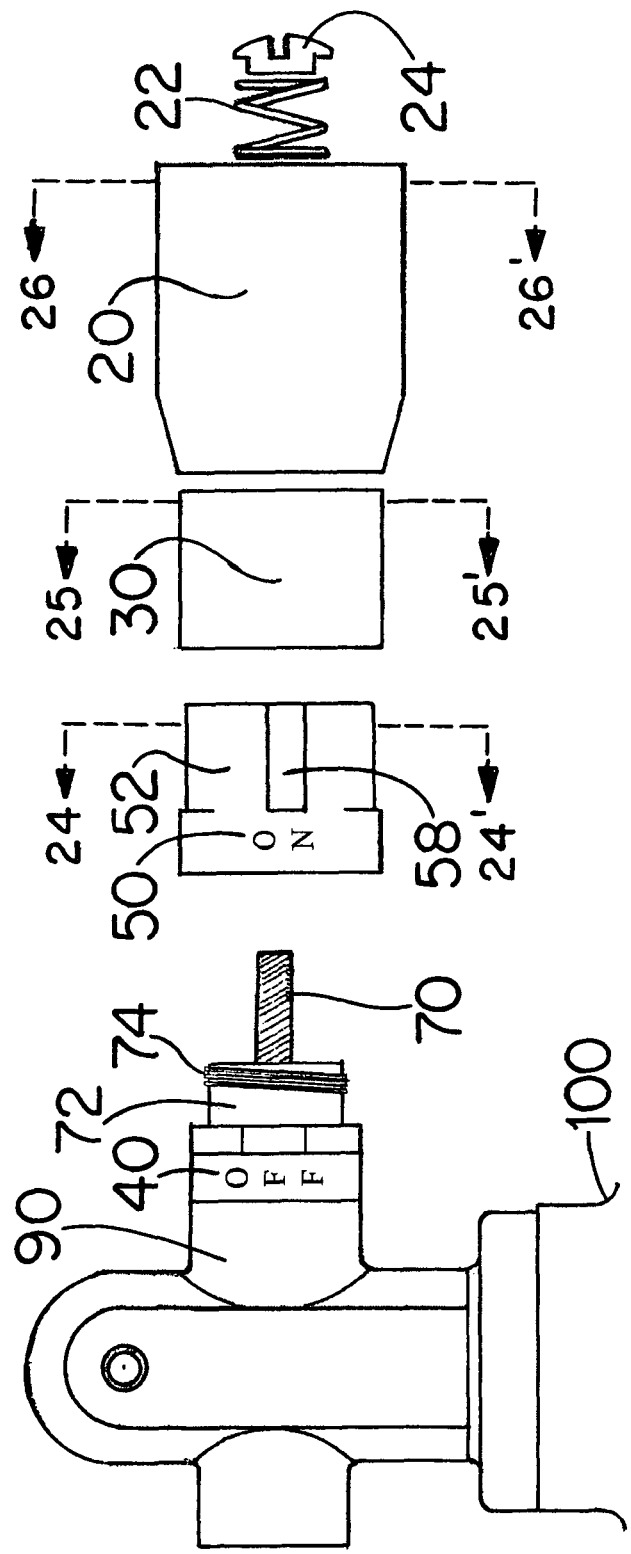
FIG. 23 is an exploded view of a fifth embodiment of the visual indicator assembly of the present invention aligned with the control valve of an air tank.
Figure 24:
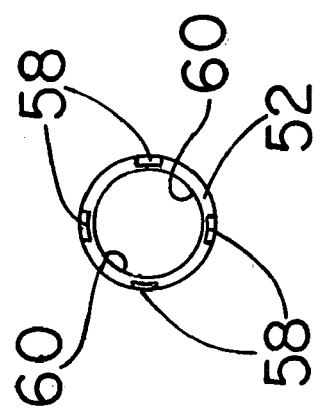
FIG. 24 is a cross sectional view along line 24-24' of one of the elements of the fifth embodiment of the visual indicator assembly of FIG. 23 of the present invention.
Figure 25:
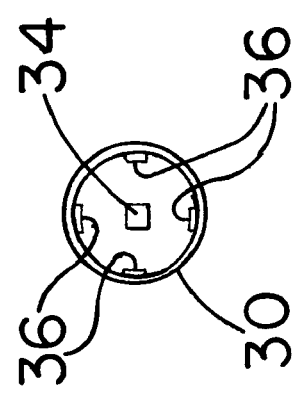
FIG. 25 is a cross sectional view along line 25-25' of one of the elements of the fifth embodiment of the visual indicator assembly of FIG. 23 of the present invention.
Figure 26:
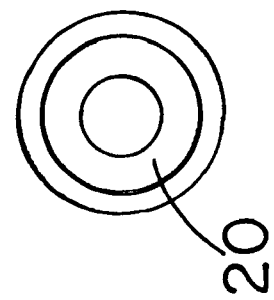
FIG. 26 is a cross sectional view along line 26-26' of one of the elements of the fifth embodiment of the visual indicator assembly of FIG. 23 of the present invention.

Referring now to FIG. 23, an exploded view of a fifth embodiment of the visual indicator assembly 10 is shown. The fifth embodiment of the visual indicator assembly 10 includes the hollow, rotatable handle member 20, with a cup member 30 having internal lands 36, which is attached within the handle member 20. The handle member 20 and internal cup member 30 extend over a portion of the control valve housing 90, with the handle member 20 attached to the isolated valve stem 70 by the threaded cap 24 and a biasing spring 22. In this embodiment, the "OFF" indicator 40 is positioned on the housing 90 containing the isolated stem control valve 65 adjacent to the rotatable handle member 20. The packing nut 72 includes external threads 74 for engaging internal threads 60 of the cylindrical sleeve member 52 containing the "ON" indicator 50, as indicated below. The internally threaded sleeve member 52, with external grooves 58 and an "ON" indicator 50, is mounted over the housing 90 and packing nut 72 containing external threads 74, with the internal threads 60, shown in FIG. 24, engaging the external threads 74 of the packing nut 72. The cylindrical sleeve member 52 includes exterior grooves 58 and is positioned within the threaded cup member 30, with the exterior grooves 58 engaging the internal lands 36 of the cup member 30. The "ON" indicator 50 is contained within the threaded cup member 30, with the control valve 65 in the closed condition. Rotation of the handle member 20 to open the control valve 65 of the air tank 100 imparts both axial and rotational movement to the internally threaded sleeve member 52, via the cup member 30 with internal lands 36 and the externally threaded packing nut 72. The cup member 30 also includes a square aperture 34 that engages the control valve stem 70. Such rotation extends the sleeve member 52 exterior to the handle member 20 and internal cup member 30, thereby covering the "OFF" indicator 40 of the housing 90 and exposing the "ON" indicator 50 of the internally threaded sleeve member 52. In this state, the passage way 95 within the housing 90 is open. Conversely, rotation of the handle member 20 to close the control valve 65 of the air tank 100 also imparts both axial and rotational movement to the internally threaded sleeve member 52, via the cup member 30 with internal lands 36. Such rotation retracts the sleeve member 52 within the handle member 20 and internal cup member 30, thereby exposing the "OFF" indicator 40 of the housing 90 and covering the "ON" indicator 50 of the internally threaded sleeve member 52. In this state, the passage way 95 within the housing 90 is closed.

Figure 27:
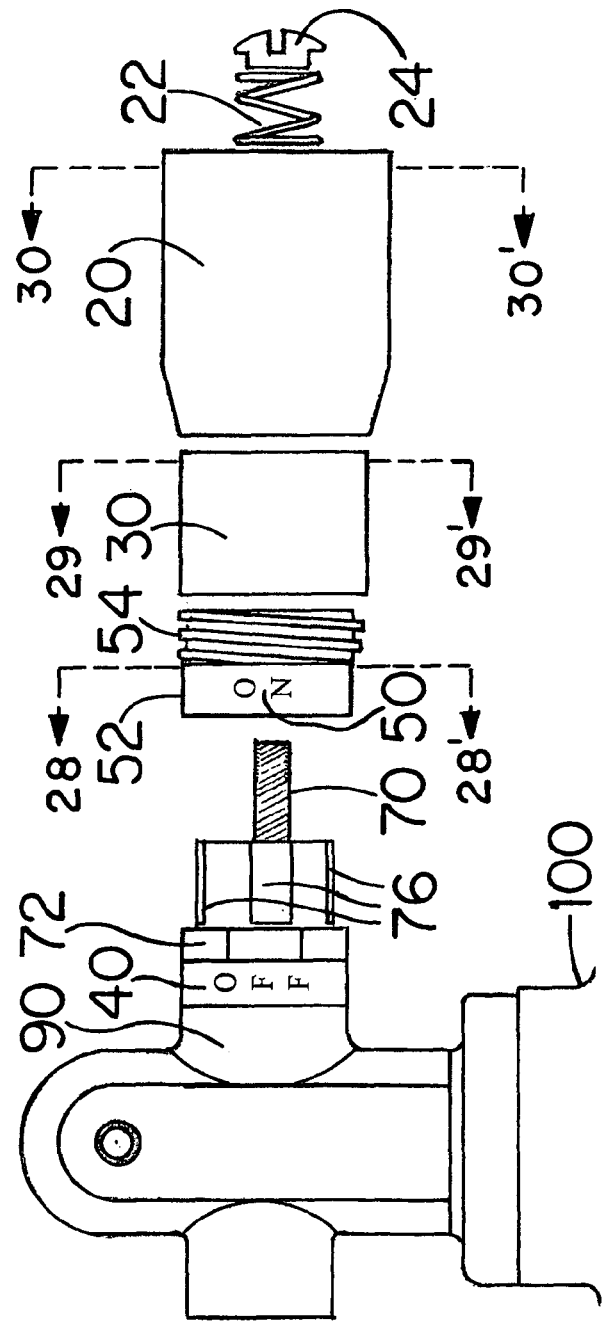
FIG. 27 is an exploded view of a sixth embodiment of the visual indicator assembly of the present invention aligned with the control valve of an air tank.
Figure 30:
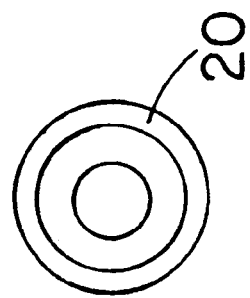
FIG. 30 is a cross sectional view along line 30-30' of one of the elements of the sixth embodiment of the visual indicator assembly of FIG. 27 of the present invention.
Figure 29:
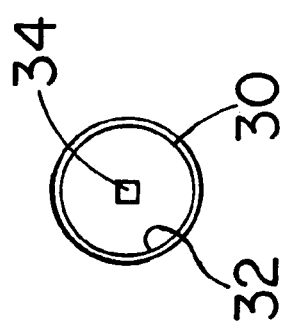
FIG. 29 is a cross sectional view along line 29-29' of one of the elements of the sixth embodiment of the visual indicator assembly of FIG. 27 of the present invention.
Figure 28:
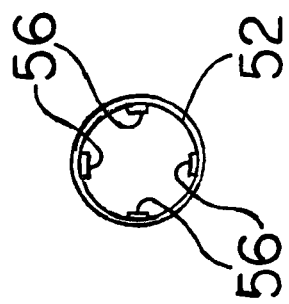
FIG. 28 is a cross sectional view along line 28-28' of one of the elements of the sixth embodiment of the visual indicator assembly of FIG. 27 of the present invention.

Referring now to FIG. 27, an exploded view of a sixth embodiment of the visual indicator assembly 10 is shown. The sixth embodiment of the visual indicator assembly 10 includes the hollow, rotatable handle member 20, with a cup member 30 with internal threads 32, which is attached within the handle member 20. The handle member 20 and internal cup member 30 extend over a portion of the control valve housing 90, with the handle member 20 attached to the isolated valve stem 70 by the threaded cap 24 and a biasing spring 22. In this embodiment, the "OFF" indicator 40 is positioned on the housing 90 containing the isolated stem control valve 65 adjacent to the rotatable handle member 20. The packing nut 72 includes external grooves 76 for engaging internal lands 56 of the cylindrical sleeve member 52 containing the "ON" indicator 50, as indicated below. The threaded sleeve member 52, with internal lands 56 and an "ON" indicator 50, is mounted over the housing 90, with the internal lands 56, shown in FIG. 28, engaging the external grooves 76 of the packing nut 72. The cylindrical sleeve member 52 includes exterior threads 54 and is positioned within the threaded cup member 30, with the exterior threads 54 engaging the internal threads 32 of the cup member 30. The "ON" indicator 50 is contained within the threaded cup member 30, with the control valve 65 in the closed condition. Rotation of the handle member 20 to open the control valve 65 of the air tank 100 imparts axial movement only to the threaded sleeve member 52, via the threaded cup member 30, which includes a square aperture 34 that engages the control valve stem 70. Such rotation extends the sleeve member 52 exterior to the handle member 20 and internal cup member 30, thereby covering the "OFF" indicator 40 of the housing 90 and exposing the "ON" indicator 50 of the threaded sleeve member 52. In this state, the passage way 95 within the housing 90 is open. Conversely, rotation of the handle member 20 to close the control valve 65 of the air tank 100 also imparts axial movement only to the threaded sleeve member 52, via the internally threaded cup member 30. Such rotation retracts the sleeve member 52 within the handle member 20 and internal cup member 30, thereby exposing the "OFF" indicator 40 of the housing 42 and covering the "ON" indicator 50 of the threaded sleeve member 52. In this state, the passage way 95 within the housing 90 is closed.

While the invention has been particularly shown and described with reference to preferred embodiments thereof, it will be understood by those skilled in the art that various changes in form and details may be made therein without departing from the spirit and scope of the invention.

I claim:

1. A visual indicator assembly for an isolated stem control valve contained in a housing of an air tank, the visual indicator assembly comprising:
   a rotatable handle member adapted for operative connection to the isolated stem control valve contained in the housing of the air tank to open and close the control valve, without axial movement of the rotatable handle member;
   an "OFF" indicator visible with the control valve in a closed condition; and
   an "ON" indicator non-visible with the control valve in a closed condition, the "ON" indicator movable to become visible and the movement of the "ON" indicator obscures the "OFF" indicator upon rotation of the handle member to adjust the control valve to an open condition, wherein the "OFF" indicator is contained on the housing of the control valve adjacent the rotatable handle member operatively connected to the control valve therein.

2. The visual indicator assembly for an isolated stem control valve contained in a housing of an air tank of claim 1, wherein the "ON" indicator is contained on a cylindrical sleeve member selectively movable into and out of the rotatable handle member.

3. The visual indicator assembly for an isolated stem control valve contained in a housing of an air tank of claim 2, wherein the cylindrical sleeve member containing the "ON" indicator moves between non-visible and visible conditions by axial movement only.

4. The visual indicator assembly for an isolated stem control valve contained in a housing of an air tank of claim 3, wherein the cylindrical sleeve member containing the "ON" indicator includes an external thread and at least one internal land.

5. The visual indicator assembly for an isolated stem control valve contained in a housing of an air tank of claim 2, wherein the cylindrical sleeve member containing the "ON" indicator moves between non-visible and visible conditions by both axial movement and rotational movement.

6. The visual indicator assembly for an isolated stem control valve contained in a housing of an air tank of claim 5, wherein the cylindrical sleeve member containing the "ON" indicator includes at least one external groove and at least one internal land.

7. A visual indicator assembly for an isolated stem control valve contained in a housing of an air tank, the visual indicator assembly comprising:
 a rotatable handle member adapted for operative connection to the isolated stem control valve contained in the housing of the air tank to open and close the control valve, without axial movement of the rotatable handle member;
 an "OFF" indicator contained on a cylindrical sleeve member extending axially from the rotatable handle member, the "OFF" indicator visible with the control valve in a closed condition; and
 an "ON" indicator contained on a cylindrical sleeve member selectively movable into and out of the rotatable handle member, the "ON" indicator non-visible with the control valve in a closed condition, the "ON" indicator movable to become visible and the movement of the "ON" indicator obscures the "OFF" indicator upon rotation of the handle member to adjust the control valve to an open condition, wherein the cylindrical sleeve member containing the "ON" indicator moves between non-visible and visible conditions by both axial movement and rotational movement.

8. The visual indicator assembly for an isolated stem control valve contained in a housing of an air tank of claim 7, wherein the cylindrical sleeve member containing the "ON" indicator includes an external thread and at least one internal land.

9. The visual indicator assembly for an isolated stem control valve contained in a housing of an air tank of claim 7, wherein the cylindrical sleeve member containing the "ON" indicator includes at least one external groove and at least one internal land.

10. The visual indicator assembly for an isolated stem control valve contained in a housing of an air tank of claim 7, wherein the cylindrical sleeve member containing the "OFF" indicator includes at least one external groove.

11. The visual indicator assembly for an isolated stem control valve contained in a housing of an air tank of claim 7, wherein the cylindrical sleeve member containing the "OFF" indicator includes an external thread.

12. A visual indicator assembly for an isolated stem control valve contained in a housing of an air tank, the visual indicator assembly comprising:
 a rotatable handle member adapted for operative connection to the isolated stem control valve contained in the housing of the air tank to open and close the control valve, without axial movement of the rotatable handle member;
 an "OFF" indicator contained on the housing of the control valve adjacent the rotatable handle member, the "OFF" indicator visible with the control valve in a closed condition; and
 an "ON" indicator contained on a cylindrical sleeve member selectively movable into and out of the rotatable handle member, the "ON" indicator non-visible with the control valve in a closed condition, the "ON" indicator movable to become visible and the movement of the "ON" indicator obscures the "OFF" indicator upon rotation of the handle member to adjust the control valve to an open condition.

13. The visual indicator assembly for an isolated stem control valve contained in a housing of an air tank of claim 12, wherein the cylindrical sleeve member containing the "ON" indicator moves between non-visible and visible conditions by axial movement only.

14. The visual indicator assembly for an isolated stem control valve contained in a housing of an air tank of claim 13, wherein the cylindrical sleeve member containing the "ON" indicator includes an external thread and at least one internal land.

15. The visual indicator assembly for an isolated stem control valve contained in a housing of an air tank of claim 12, wherein the cylindrical sleeve member containing the "ON" indicator moves between non-visible and visible conditions by both axial movement and rotational movement.

16. The visual indicator assembly for an isolated stem control valve contained in a housing of an air tank of claim 15, wherein the cylindrical sleeve member containing the "ON" indicator includes at least one external groove and at least one internal land.

17. A visual indicator assembly for an isolated stem control valve contained in a housing of an air tank, the visual indicator assembly comprising:
 a rotatable handle member adapted for operative connection to the isolated stem control valve contained in the housing of the air tank to open and close the control valve, without axial movement of the rotatable handle member;
 an "OFF" indicator visible with the control valve in a closed condition, wherein the "OFF" indicator is contained on a cylindrical sleeve member extending axially from the rotatable handle member, wherein the cylindrical sleeve member containing the "OFF" indicator includes an external thread;
 an "ON" indicator non-visible with the control valve in a closed condition, the "ON" indicator movable to become visible and the movement of the "ON" indicator obscures the "OFF" indicator upon rotation of the handle member to adjust the control valve to an open condition.

* * * * *